United States Patent [19]

Dolazza et al.

[11] Patent Number: 5,034,813
[45] Date of Patent: Jul. 23, 1991

[54] SYSTEM FOR SIGNAL DIGITIZATION BY SPACED INTERVAL SAMPLING

[75] Inventors: Enrico Dolazza, Boston; Alexander Kolchinsky, Andover; Richard McMorrow, Lincoln, all of Mass.; Jeremy Muller, Pelham, N.H.; Hans Weedon, Salem, Mass.

[73] Assignee: Analogic Corporation, Peobody, Mass.

[21] Appl. No.: 557,575

[22] Filed: Jul. 24, 1990

[51] Int. Cl.$^5$ .............................. H04N 7/12
[52] U.S. Cl. .................... 358/138; 358/139; 358/141; 341/122
[58] Field of Search ............... 358/36, 37, 166, 93, 358/101, 106, 211, 138, 133, 139, 141; 341/126, 122, 124

[56] References Cited

U.S. PATENT DOCUMENTS

| 4,658,300 | 4/1987 | Kawamura | 358/138 |
| 4,725,814 | 2/1988 | Pohl | 344/122 |
| 4,774,575 | 9/1988 | Takayama | 358/138 |
| 4,791,475 | 12/1988 | Lopez Luz | 358/139 |
| 4,891,713 | 1/1990 | Mizukoshi | 358/138 |

Primary Examiner—Howard W. Britton
Assistant Examiner—Sherrie Hsia
Attorney, Agent, or Firm—Joseph S. Iandiorio; Brian M. Dingman

[57] ABSTRACT

A signal digitization system and method is disclosed which identifies a plurality of sets of spaced intervals of information; defines a strobing window within each spaced interval in one of the sets at a time; strobes the signal during the strobing window; integrates and holds the strobed signal; and digitizes the integrated signal.

8 Claims, 4 Drawing Sheets

SYSTEM FOR SIGNAL DIGITIZATION BY SPACED INTERVAL SAMPLING

FIELD OF INVENTION

This invention relates to a signal digitization system and method, and more particularly to such a system and method for digitizing a video signal, and further to such a system which integrates the signals sequentially in staggered sets to eliminate noise and decrease required processing speed.

BACKGROUND OF INVENTION

In general, image digitization systems use a low pass filter to limit the noise bandwidth and to eliminate possible aliasing. The use of the low pass filter, however, typically effects strong attenuation of the frequency close to the Nyquist frequency, thus introducing some smearing of sharp edges of the image. When a video signal is the output of a D/A converter that converts both image and alphanumeric information, or the output of a CCD camera, the intrinsic bandwidth of the signal extends well beyond the D/A sampling frequency. In that case, if oversampling is to be avoided, when the signal is redigitized the signal can be digitized synchronously, i.e., using an A/D converter clock that operates at the same frequency as the D/A converter clock. If that is done, aliasing may be prevented. But then in order to preserve the sharpness of the alphanumeric information, the front end circuit should not filter the signal. In this case, however, the bandwidth of the noise is not limited and thus causes noise in the redigitized image, specifically visible in its flat field areas.

Separately, image digitization systems which contain conventional two hundred and fifty-six ($2^8$) true gray levels must be redigitized in at least $2^9$ gray levels to remove the intrinsic uncertainty of the least significant bit, which would otherwise result in some artifacts specifically visible in a flat field area of the image: specifically, when the image must be compensated for high gamma correction effects, for example. In dealing with the digitization of high resolution images (1280 lines × 1024 pixels/line) that are displayed in progressive mode at 60 Hz or in interlaced mode at 120 fields per second, pixel time approaches eight or nine nanoseconds, which corresponds to a D/A converter rate of approximately 110 MHz for synchronous digitization (and much more, two or three times that, if oversampling is applied). However, nine or ten bit A/D converters that would operate at such speeds would be expensive and difficult to build. Such high speed data flow typically requires an intermediate memory buffer (frame grabber or line buffers) for interfacing with a conventional main memory that typically has a much lower throughput.

SUMMARY OF INVENTION

It is therefore an object of this invention to provide a digitization method and system which when applied to an information signal limits the noise bandwidth yet preserves the sharpness of steep transitions in the information.

It is a further object of this invention to provide a digitization method and system which when applied to a video signal limits the noise bandwidth yet preserves full pixel to pixel contrast resolution of alphanumeric characters and other steep transitions in the signal.

It is a further object of this invention to provide a method and system which decreases the sampling frequency of the A/D converter so that even nine and ten bit A/D converters are economically applicable for high resolution images.

It is further object of this invention to provide a method and system that enables a sampling rate which matches the available bandwidth of the main memory which receives the data so that no intermediate memory buffer is required.

The invention results from the realization that a truly effective and economical digitizing technique can be achieved which (a) reduces noise yet preserves sharpness in an image or other information signal by integrating the information or pixel during a pixel interval and digitizing that integrated value, and which (b) enables digitizing high-frequency input signals without requiring high-speed A/D converters, memories and/or buffers by dividing the information intervals (pixels) into a plurality of different sets of spaced pixels and processing them sequentially one set at a time, and from the further realization that the integrating filter and set by set processing can be combined to accomplish crisp digitization of high-frequency input signals with conventional-speed components.

This invention features a video signal digitization system including means for identifying a plurality of sets of spaced pixel intervals of a video frame time. There are means responsive to the means for identifying for defining a strobing window within each spaced pixel interval in one of the sets at a time. Means responsive to the means for defining, strobe the video signal during the strobing window. Means responsive to the means for strobing integrate the strobe signal and hold the integrated strobe signal. An A/D converter is responsive to the means for integrating and holding for digitizing the integrated signal.

In broader view, the invention features a signal digitization system which is operable for signals other than specific video signals as illustrated in the specific embodiment disclosed herein.

The invention also features the sequential set processing and the integrating filter techniques independently of one another. That is, the invention features a video signal digitization system which has means for identifying a plurality of sets of spaced pixel intervals of a video frame time and means, responsive to the means for identifying, for strobing the video signal during each interval and employing an A/D converter responsive to the means for strobing for digitizing the strobe signal without integration.

Additionally, the invention features a video signal digitization system having means for identifying a plurality of pixel intervals of a video frame time and means responsive to the means for identifying for defining a strobing window within each spaced pixel interval, independent of any division of the intervals into sets. There are means responsive to the means for defining for strobing the video signal during the strobing windows and for integrating the strobe signal and holding the integrated strobe signal for an A/D converter which digitizes the integrated signal.

The invention also features a method of digitizing a video signal including identifying a plurality of sets of spaced pixel intervals of a video frame time, defining a strobing window within each spaced pixel interval in one of the sets at a time, and strobing the video signal during the strobing window. The strobe signal is integrated and held and then converted from analog to digital form.

The method may also be accomplished more broadly in a signal digitization system which is not limited to video signal inputs. There, too, the invention features a method of performing the signal digitization in set by set fashion but without the integrating filtration, or alternatively, contemplates a method of integrating filtration without the set by set processing.

DISCLOSURE OF PREFERRED EMBODIMENT

Other objects, features and advantages will occur to those skilled in the art from the following description of a preferred embodiment and the accompanying drawings, in which.

The invention may be accomplished in a specific video application in which the image information is provided in a matrix of columns and rows in a typical raster. In accordance with one feature of the invention, the columns are divided up and identified in a plurality of sets of spaced pixel intervals. For example, if the number of sets is n, then the first column and every nth column after that is a first set. The second set would consist of column 2 and every 2+nth column after that, and so on, for an entire video frame. A pixel digitized in one pass may be organized differently, such as: not sequential along each line or not with the same sequence for all lines, e.g. by column.

A strobing window is defined within each spaced pixel interval in one of the sets at a time, whichever set is being worked on at present. During that strobe window, the video signal is strobed and the output is integrated and held by an integrate and hold circuit whose output is then clocked into an A/D converter for digitization. "Strobe" is used herein to indicate sampling.

Figure 1:
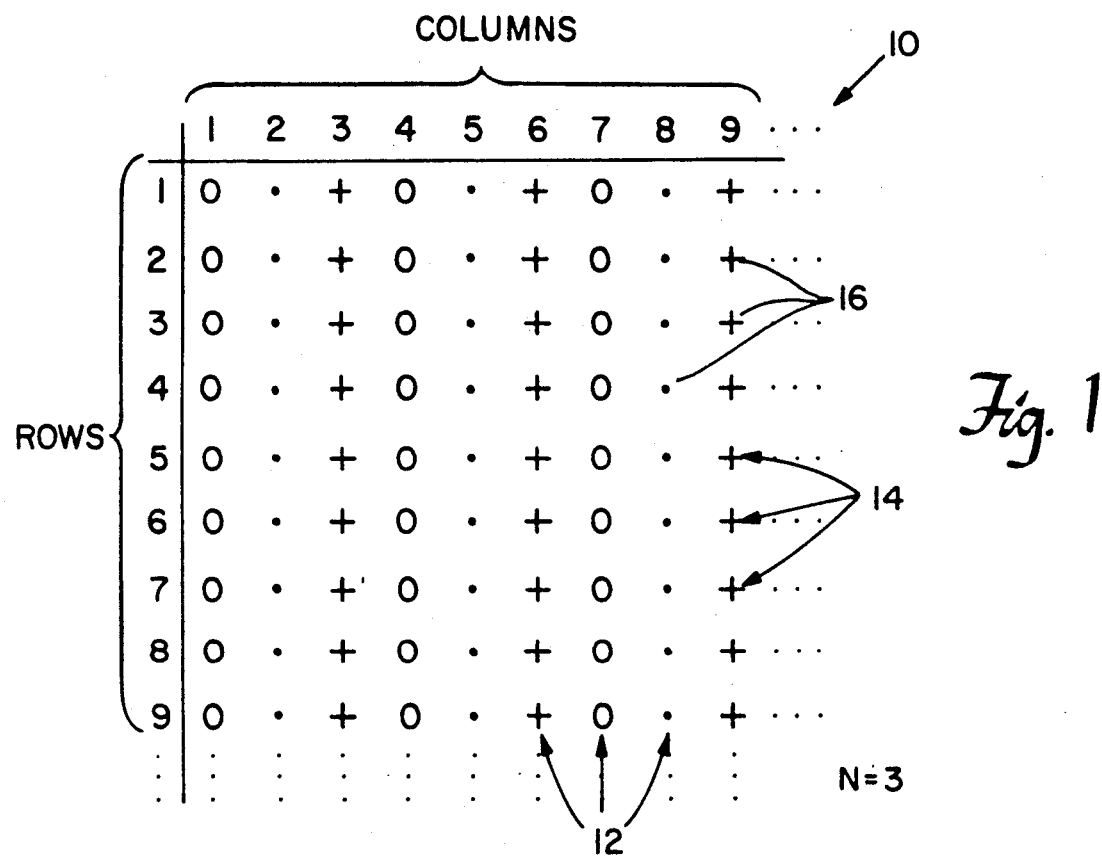
FIG. 1 is a diagrammatic representation of a video image composed of a matrix of columns and rows of pixels.
Figure 2:
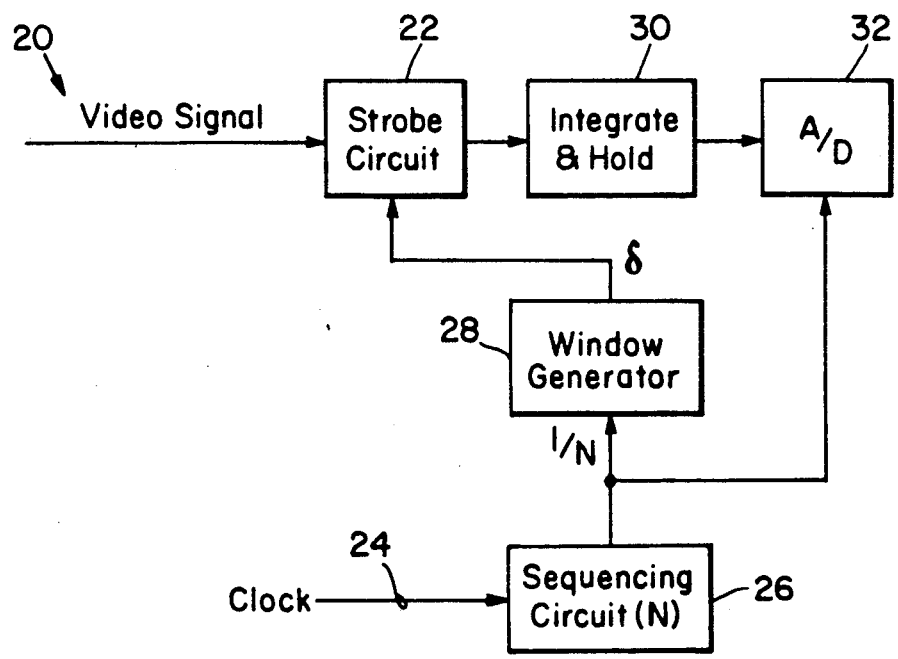
FIG. 2 is a block diagram of a digitization system which accomplishes both features of this invention: the integration filtering and the set by set processing.

There is shown in FIG. 1 a representation of a video image 10 in a typical raster form including a matrix of columns 12 and rows 14. In FIG. 1, where n, the number of sets has been chosen to equal 3, every third column, column 1, column 4, column 7, . . . , are included in the first set. They are indicated by circles. The second set includes the pixels indicated by the dots in columns 2, 5, 8, . . . . The third set includes the pixels represented by crosses in columns 3, 6, 9, . . . . The video signal, includes an analog representation of the series of pixels in row 1 followed by the series of pixels in row 2, row 3, and so on. This composite video signal 20, FIG. 2, is delivered to strobe circuit 22. A clock signal 24 is delivered to sequencing circuit 26. Clock signal 24 may be an internally generated clock such as derived from a phase-locked loop circuit whose input receives a video signal 20 together with timing information (as for instance a composite video signal) or clock signal 24 may be received externally from a digital to analog converter which previously processed the information in systems where the video signal 20 is the product of a D/A converter.

Figure 3:
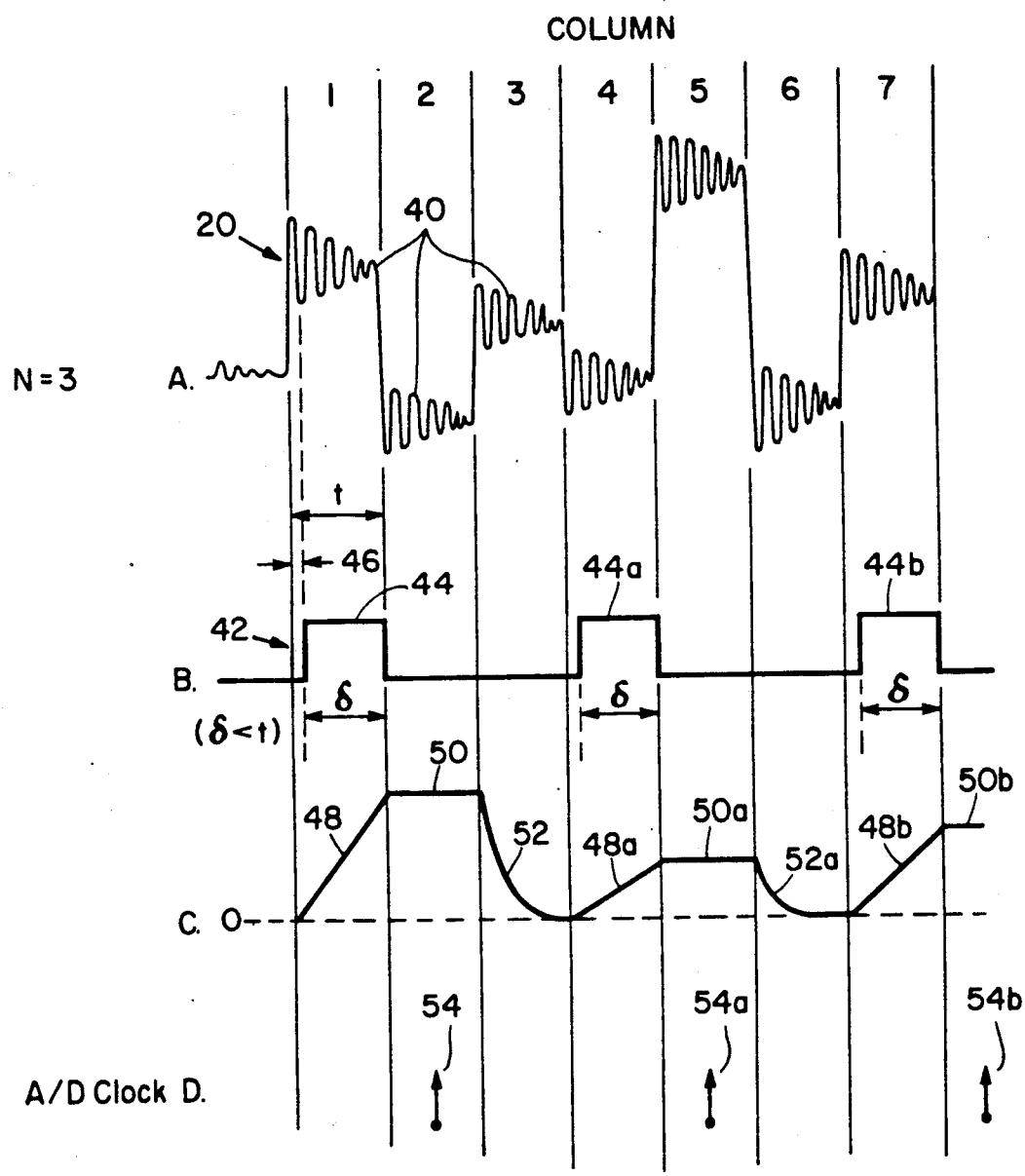
FIG. 3 is an illustration of a portion of a video signal, window signal, integration and hold signal, and A/D clocking signals.

Sequencing circuit 26 programmed with n equal to 3, causes strobe circuit 22 to gate through a portion of video signal 20 on every third pixel. It also drives window generator circuit 28 to create a window within the period of the strobed pixel interval during which integrate and hold circuit 30 is operative to integrate the pixel interval and hold it. After the integration is complete, the integrated signal is clocked into A/D converter 32 which provides a digitized output of composite video signal 20. The video signal for the first seven columns of a single row is shown in illustration A of FIG. 3, where each pixel interval 40 has a period t. The window signal 42 generated by window generator 28 is shown in illustration B, FIG. 3, where it can be seen that each window pulse 44 has a duration s which is typically slightly less than the period t of the pixel signal 40. In illustration B, FIG. 3, window pulse 44 begins a short time 46 after the beginning of period t. It is during this window period 44 that the integration 48 takes place as shown in illustration C of FIG. 3. At the end of the period the integration by integrate and hold circuit 30 stops, and the integrated value is held as shown by the level 50 subsequent to each integration ramp 48. It is during this period that the level 50 is clocked by a clock pulse 54, illustration D of FIG. 3, into a D/A converter. Subsequent to the hold period 50, a reset occurs which resets the integrate and hold circuit 30 and causes the decay of the signal at 52 to reach the zero level.

Figure 4:
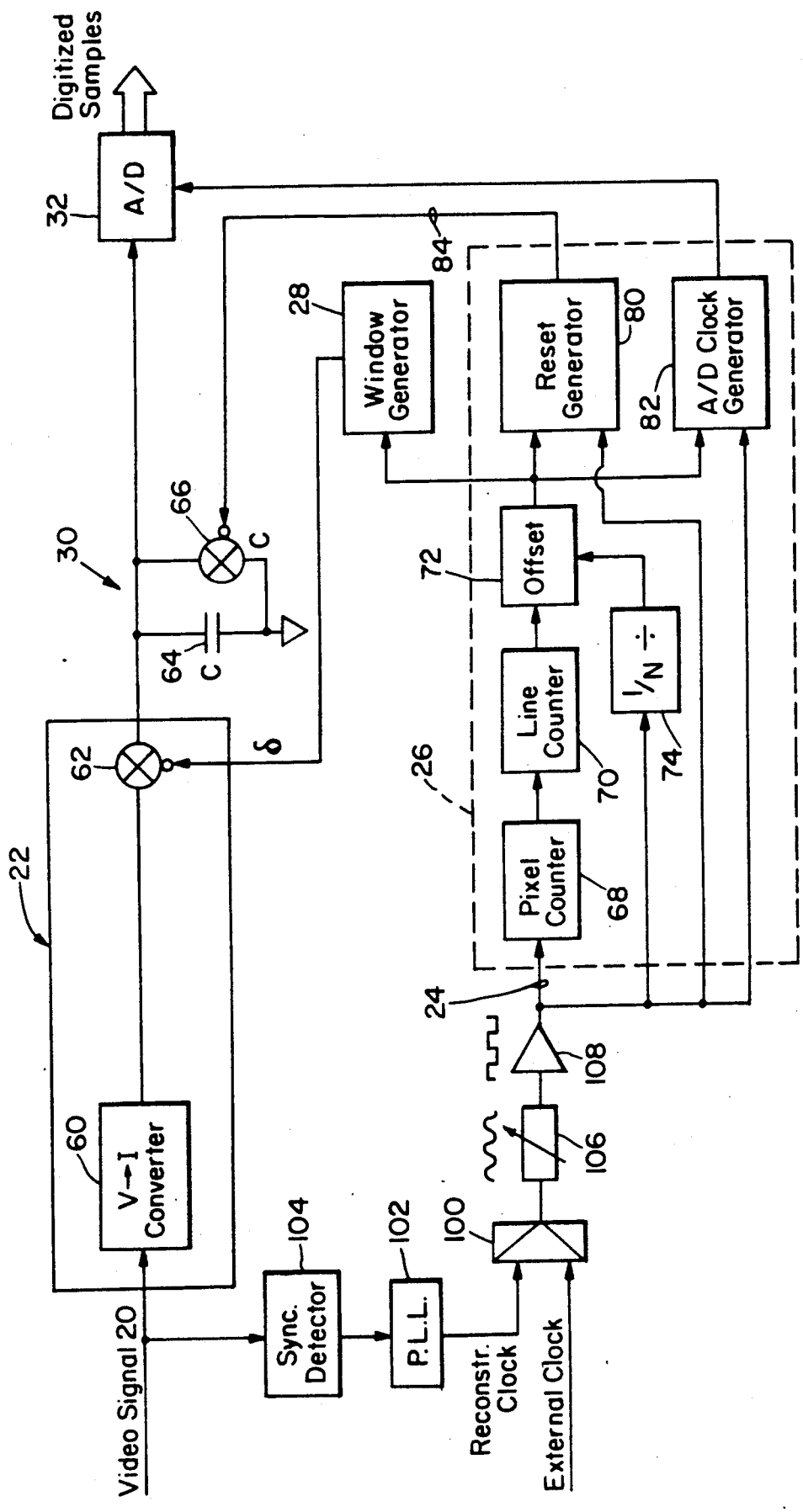
FIG. 4 is a more detailed diagram of the system of FIG. 2.

In a preferred embodiment, strobe circuit 22, FIG. 4, includes a voltage to current converter 60 along with a switch 62, which may be a FET. Integrate and hold circuit 30 includes capacitor 64 and another switch 66. Sequencing circuit 26 includes pixel counter 68 which provides an output each time a complete line of pixels is counted. Line counter 70 counts the number of lines completed by the input from pixel counter 68 and delivers the signal to offset circuit 72 when all the lines in a complete frame have occurred. Offset circuit 72 then introduces an offset: a programmable number of clocking pulses (from horizontal sync pulse to the beginning of actual video data) plus 0, 1 or 2 sequentially to the clocking pulses provided by divider circuit 74 which divides the incoming clock pulses 24 by n in the specific example indicated previously and equals 3. The output from offset 72 drives window generator 28. It also drives reset generator 80 and A/D clock generator 82. It is reset generator 80 which closes switch 66 to provide a reset signal on line 84 that resets the integrate and hold circuit 30 by discharging capacitor 64 and creates the signal decay shown at 52 in FIG. 3. A/D clock generator 82 provides the clock signal 54 in FIG. 3, which reads out the integrated signal at 50. Gate 100 receives the reconstructed clock input from phase locked loop count 102 synchronized to video signal 20 by synchronized detector 104. The output of gate 100 is delivered on line 24 after passing through adjustable delay line 106 and shaping amplifier 108.

The invention contemplates a method of digitizing signals and especially video signals, by identifying a plurality of sets of spaced information intervals and defining a strobing window within each spaced interval in one set at a time. The signal is strobed during the strobe window and the strobe signal is integrated and held, after which it is converted from analog to digital form.

Each of the features, the integrating filter and the set by set processing, are independently functional.

Figure 5:
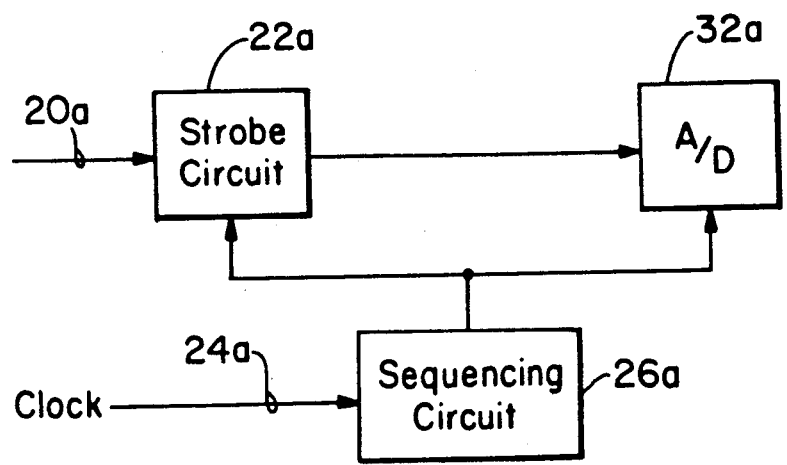
FIG. 5 is a simplified block diagram of a system for accomplishing the set by set processing feature of this invention.

Digitizing system 10a, FIG. 5, provides video signal 20a to strobe circuit 22a, which is operated by sequencing circuit 26a driven by clock circuit 24a to periodically provide an output to A/D converter 32a, so that every nth pixel or information bit is processed in a set by set fashion, as previously described, to produce the high digitization speed with conventional speed components.

Figure 6:
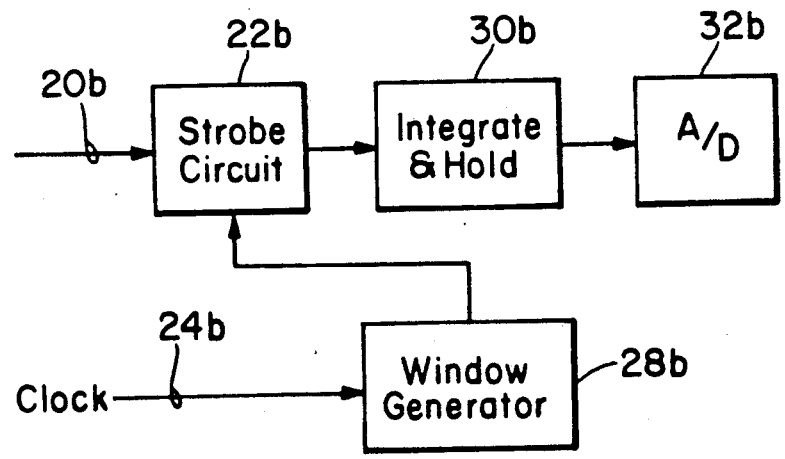
FIG. 6 is a simplified block diagram of a circuit for accomplishing the integration filtering according to this invention.

Similarly, the integration filtering can be accomplished with the video signal 20b submitted to strobe circuit 22b, FIG. 6. Window generator 28b then operates strobe circuit 22b on each pixel occurrence to create the filtered output which A/D converter 32b receives. In such a case, integrate and hold circuit 30b would require a tandem connection of more than one capacitive integration and hold circuit in order to provide the necessary time for holding and resetting.

Although the examples used herein refer to ordered sets, i.e. columns, this is not a necessary limitation of the invention, and in certain cases it may even be beneficial to have the sets of spaced pixels contained within each line randomly selected on a line-by-line basis to minimize possible column artifacts.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A video signal digitization system comprising:
means for identifying a plurality of sets of spaced pixel intervals of a video frame time;
means, responsive to said means for identifying, for defining a sampling window within each spaced pixel interval in one of said sets at a time;
means, responsive to said means for defining, for sampling the video signal during said sampling window;
means, responsive to said means for sampling, for integrating the sampled signal and holding the integrated sampled signal;
A/D converter means, responsive to said means for identifying, for digitizing the integrated signal.

2. A video signal digitization system comprising:
means for identifying a plurality of pixel intervals of a video frame time;
means, responsive to said means for identifying, for defining a sampling window within each said pixel interval;
means, responsive to said means for defining, for sampling the video signal during said sampling windows;
means, responsive to said means for sampling, for integrating the sampled signal and holding the integrated sampled signal; and
A/D converter means, responsive to said means for identifying, for digitizing the integrated signal.

3. A video signal digitization system comprising:
means for identifying a plurality of sets of spaced pixel intervals of a video frame time;
means, responsive to said means for identifying, for sampling the video signal during each said interval;
means, responsive to said means for sampling, for integrating the sampled signal and holding the integrated sampled signal; and
A/D converter means, responsive to said means for identifying, for digitizing the integrated signal.

4. A signal digitization system comprising:
means for identifying a plurality of sets of spaced information intervals of the signal to be digitized;
means, responsive to said means for identifying, for defining a sampling window within each spaced interval in one of said sets at a time;
means, responsive to said means for defining, for sampling the signal during said sampling window;
means, responsive to said means for sampling, for integrating the sampled signal and holding the integrated sampled signal; and
A/D converter means, responsive to said means for integrating and holding, for digitizing the integrated signal.

5. A video digitization method comprising:
identifying a plurality of sets of spaced pixel intervals of a video frame time;
defining a sampling window within each spaced pixel interval in one of the sets at a time;
sampling the video signal during the sampling window;
integrating the sampled signal and holding the integrated sampled signal; and
converting the integrated signal from analog to digital form.

6. A signal digitization method comprising:
identifying a plurality of pixel intervals of a video frame time;
defining a sampling window within each spaced pixel interval;
sampling the video signal during the sampling window;
integrating the sampled signal and holding the integrated sampled signal; and
converting the integrated signal from analog to digital form.

7. A video digitization method comprising:
identifying a plurality of sets of spaced pixel intervals of a video frame time;
sampling the video signal during each interval;
integrating the sampled signal and holding the integrated sampled signal; and
converting the sampled signal from analog to digital form.

8. A signal digitization method comprising:
identifying a plurality of sets of spaced information intervals of the signal to be digitized;
defining a sampling window within each spaced interval in one of the sets at a time;
sampling the signal during the sampling window;
integrating the sampled signal and holding the integrated sampled signal; and
converting the integrated signal from analog to digital form.

* * * * *